United States Patent [19]

Colineau et al.

[11] Patent Number: 5,459,619
[45] Date of Patent: Oct. 17, 1995

[54] METHOD OF READING RECORDING DATA AND A READ SYSTEM

[75] Inventors: Joseph Colineau, Bures sur Yvette; Jean-Claude Lehureau, St. Genevieve des Bois, both of France

[73] Assignee: Thomson-CSF, Puteaux, France

[21] Appl. No.: 311,715

[22] Filed: Sep. 23, 1994

Related U.S. Application Data

[63] Continuation of Ser. No. 966,518, Oct. 23, 1992, abandoned.

[30] Foreign Application Priority Data

Oct. 29, 1991 [FR] France .................. 91 13314

[51] Int. Cl.⁶ .............. G11B 5/09; G11B 5/127
[52] U.S. Cl. .............. 360/47; 360/113
[58] Field of Search .............. 360/113, 133, 360/132, 77.01, 65, 63, 48, 47, 46, 121

[56] References Cited

U.S. PATENT DOCUMENTS

| | | | |
|---|---|---|---|
| 3,158,846 | 11/1964 | Silverman | 360/47 |
| 3,769,465 | 10/1973 | Wellbrock | 360/77.12 X |
| 4,616,272 | 10/1986 | Moriyama | 360/47 |
| 4,903,150 | 2/1990 | Juso et al. | 360/77.12 |
| 4,953,161 | 8/1990 | Tayama | 360/63 X |

FOREIGN PATENT DOCUMENTS

| | | | |
|---|---|---|---|
| 0400678 | 12/1990 | European Pat. Off. | 360/113 |
| 0831264 | 11/1975 | France | 360/46 |
| 0036010 | 3/1977 | Japan | 360/77.12 |
| 52-3601 | 3/1977 | Japan | 360/113 |
| 58-77009 | 5/1983 | Japan | 360/113 |
| 0189877 | 11/1983 | Japan | 360/77.12 |
| 1478339 | 6/1979 | United Kingdom . | |

OTHER PUBLICATIONS

IBM Technical Disclosure Bulletin, vol. 13, No. 8, Jan. 1971, pp. 2294–2295, E. W. Pugh, "Multitrack Magnetic Transducer with Excess Heads".

Primary Examiner—Donald Hajec
Assistant Examiner—Minh Le Thien
Attorney, Agent, or Firm—Oblon, Spivak, McClelland, Maier & Neustadt

[57] ABSTRACT

The invention relates to a method and system reading data recorded in the form of tracks on a magnetic recording medium. The recorded data is read by a row of read heads greater in number than a number of data tracks. The system of the invention does not require the read heads to follow the data tracks when reading recorded data, and allows a magnetic tape to be read even if the positions of the data tracks relative to the read head positions are unknown. The reading system of the present invention finds particular application in the area of reading high density recorded magnetic tapes.

14 Claims, 5 Drawing Sheets

METHOD OF READING RECORDING DATA AND A READ SYSTEM

This application is a continuation of application Ser. No. 07/966,518, filed on Oct. 23, 1992, now abandoned.

BACKGROUND OF THE INVENTION

The invention is a method of reading recorded data and a system employing this method. More specifically, the invention is a method and a system for reading magnetic tape, particularly a computer tape, containing several data tracks without knowing the exact position of the read heads relative to the tracks. Nonetheless, the invention is applicable to other types of recording.

A magnetic tape can form a high-density (1 $\mu m^2$ per bit on Evaporated Metal tape) data support. The physical formats used to record data on the tape can vary. The particular format depends on the performance required of the application and is closely tied to a specific type of recorder-playback machine.

In particular, there are three types of physical recording formats which depend on how the magnetic tape is scanned:

longitudinal recording transverse recording helical recording

In addition, neighboring tracks can be separate or adjacent and recorded at the same azimuth or different azimuths.

Finally, the organization of data within the tracks and the way they are represented on the tape (modulation mode) vary.

Consequently, existing recorders are generally only compatible with one recording standard or, at most, various standards differing only by the modulation mode used.

The most "natural" way of using magnetic heads is to allocate one read head to each physical track on the tape and then use a sufficiently accurate mechanical guidance system or a position servocontrol system to ensure each head is accurately positioned above the corresponding track.

However, this method is difficult to apply when several different recording formats are to be read with the same head or when it is necessary to read different tapes whose recording formats are not known. Moreover, there is a trend to use high recording densities on tapes and it then becomes necessary to ensure the magnetic head strictly follows the tracks on the tape; this is difficult to do.

The present invention overcomes these difficulties by offering a method and a magnetic tape read system which does not require the head to follow the tracks on the tape and which allows a tape to be read even if the position of the tracks (relative to the head positions) is unknown, i.e. when the recording format is not known.

SUMMARY OF THE INVENTION

The invention is, therefore, a method of reading a magnetic tape containing several data tracks recorded along the tape, in which:

at least one set of individual magnetic heads are placed across the tape direction of travel, the number of individual heads exceeding the number of tracks on the tape;

each individual magnetic head reads all magnetic data recorded on the tape passing in front of it;

during a first integration operation, the absolute value of the signal output by each individual magnetic head is integrated for each individual magnetic head;

during a second integration operation, the sum of the signals output by the two heads in each pair of neighboring individual magnetic heads is integrated;

the results of the two above integration operations are superimposed, in space, so that the results of the second integration are interposed between the results of the first integration to give a profile of the values;

the value maxima in this profile of values are detected and these maxima are located relative to the individual magnetic head positions to determine the position of the heads relative to the tracks on the tape.

The invention is also a system to read a magnetic tape which contains several data tracks recorded along the tape, in which the system comprises a magnetic head, itself comprising at least one set of individual magnetic heads positioned across the tape direction of travel, the number of individual magnetic heads exceeding the number of tracks on the tape.

The invention is also a system to read a magnetic tape which contains several data tracks recorded longitudinally, this system comprising:

a magnetic head, itself comprising at least one set of individual magnetic heads placed across the direction of travel of the tape, the number of individual magnetic heads exceeding the number of tracks on the tape;

a first series of integration circuits to integrate the absolute values of the signals output by the individual magnetic heads, there being one integration circuit per individual magnetic head;

a second series of integration circuits, there being one integration circuit common to each pair of neighboring individual magnetic heads, each circuit integrating the sum of the signals output by the two neighboring heads;

a circuit to linearly combine the integration results from the first series of integration circuits and those from the second series of integration circuits.

BRIEF DESCRIPTION OF THE DRAWINGS

The various purposes and characteristics of the invention will be better understood on reading the following description of an example of an embodiment, this description being based on the appended figures of which.

DETAILED DESCRIPTION OF THE INVENTION

Figure 1:
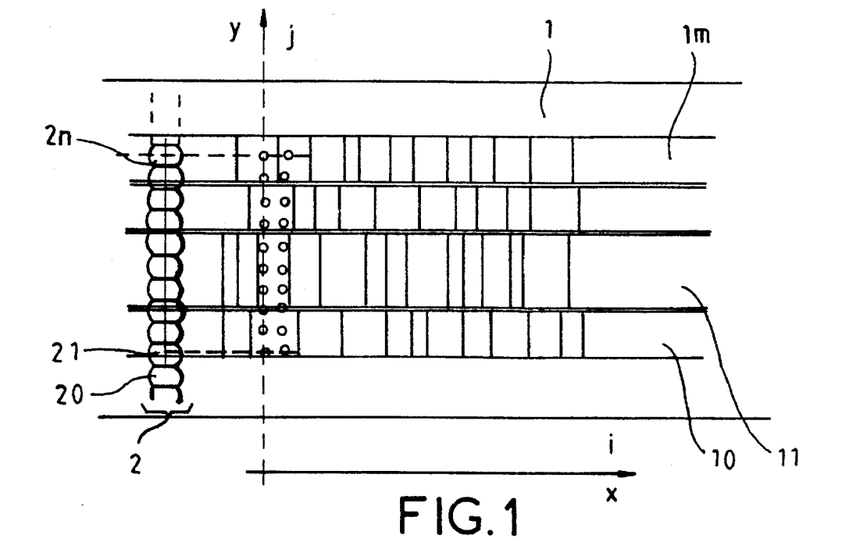
FIG. 1 is an example of an embodiment of a read system complying with the invention.

In the invention, as shown in FIG. 1, to read a magnetic tape 1 carrying tracks 10, 11, . . 1m, a magnetic head 21, comprising various individual magnetic heads 20, 21 . . 2n, is placed across the tape direction of travel x.

One particular aspect of the invention is that the number of individual magnetic heads 20 to 2n differs from the number of tracks and, in particular, exceeds the number of tracks 10 to 1m.

As shown on FIG. 1, tracks 10 to 1m differ in width. In a preferred embodiment, magnetic heads 20 to 2n are identical and each reads an equivalent portion of the tape; however, this is not essential to the application of the invention.

When the read heads are arranged in a row, the magnetic tape surface "covered" by the row of heads is read. The two-dimensional magnetic data contained in this surface is therefore sampled at intervals of p in the transverse direction by the n read heads placed at pitch p and, in the longitudinal direction, at intervals of where 1=v*T is the distance travelled by the tape moving at velocity v during one period t of the read head sampling clock.

The circles represent the physical position of the center of signal samples measured on the tape. Here, each sampling surface is assumed to be rectangular but other sampling structures (for example staggered) could be used. Provided the Nyquist criterion applied to two-dimensional signals is respected, it is possible to collect and separate the data from the various tracks without necessarily having a geometrical head arrangement similar to that of the magnetic tapes on the track nor accurate alignment relative to each other.

We shall now describe another aspect of the invention concerning the processing of the data read by a strip of individual magnetic heads placed across the magnetic tape.

In the processing, it is assumed that each individual read head reads data from the tape but, initially, the system knows neither the identity of the tracks read by the heads nor the position of each head relative to the tracks. It is therefore necessary to consider the data read at each instant by a set of individual heads 10 to 1n as a whole. We must, therefore, introduce the concept of the transverse dimension of the signal corresponding to the transverse length read by all individual heads.

Within this tranverse dimension, the signal is sampled due to the structure of separate heads. The signal can be sampled synchronously or asynchronously.

A synchronous sample will result from a set of heads aligned with the magnetic tracks. The processing required is to achieve the best possible separation of tracks by transverse filtering. This process is only possible if samples of the signal on the track next to the track considered are available. A set of read heads in a row allows all samples to be acquired simultaneously, which is not possible with a set of heads arranged in two or several separate rows and even less possible with rotating read heads where signals on neighboring tracks, which are adjacent on the tape, are read at times separated by one revolution, or fraction of a revolution, of the read head.

It is also possible, as in the longitudinal direction, to sample the data asynchronously. This implies that the read heads need not be aligned with the tracks. This is particularly true when the accuracy of the mechanical guide system is insufficient and the machine does not include a head position servocontrol system. It is also true when the machine must be capable of reading tapes with different geometrical formats.

As in the single-dimensional case, it is possible to retrieve the data using the following operations:

two-dimensional lowpass filtering (before sampling);

two-dimensional filtering;

two-dimensional equalization (track separation and reduction of interference between symbols on each track);

decimation and/or rephasing.

The following are necessary:

the sampling frequencies must be sufficiently high, for example more than twice the channel chopping frequency, in both directions.

Figure 2A:
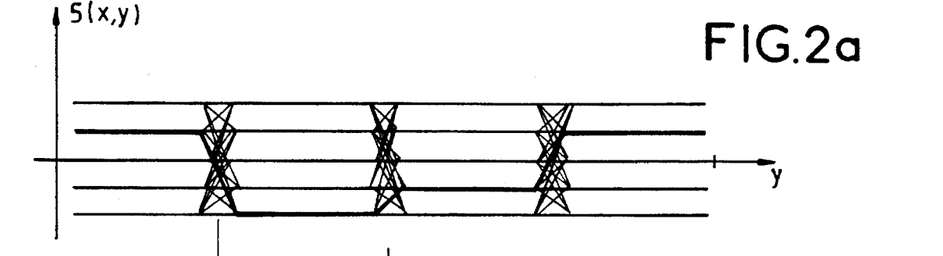
FIGS. 2a, 2b and 3 are diagrams which explain the problem resolved by the invention.

FIG. 2a shows, as an example, a signal read across the tape, i.e: a signal containing the data present on all the various tracks of the tape along a line across the tape corresponding to a row of individual read heads. It is this transverse signal which must be identified when the position of the individual heads relative to the signal is unknown.

Figure 2B:
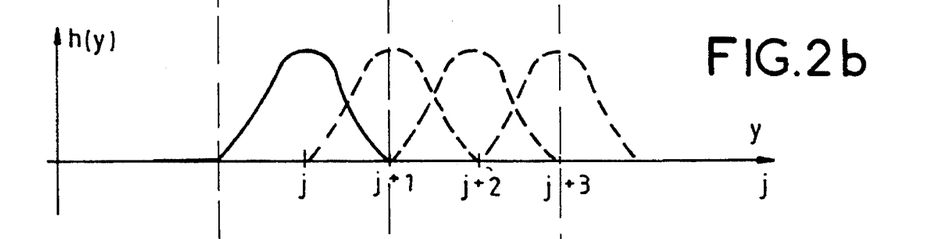

Each individual read head j outputs, at instant i, a sampled signal resulting from the convolution of data $S(x,y)$ recorded on the tape by the head two-dimension "aperture function" (or pulse response) $h(x,y)$. FIG. 2b represents the aperture function for an individual head.

Figure 3:
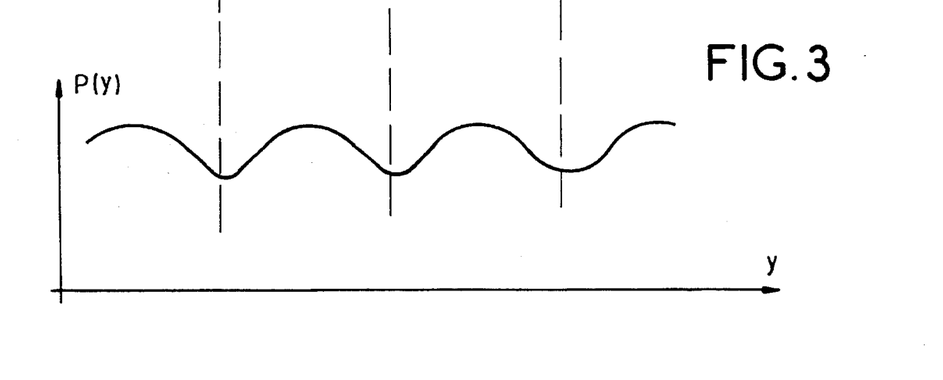

Let $p(j)$ be the mean level of the signal read. This level will be a maximum if the head is precisely centered over a physical track. FIG. 3 shows how $p(y)$ varies with different head positions relative to the signal-to be read. If the tracks are adjacent, with no separation, if the signal level on each track is 1 and if neighboring track signals are independent, the value of $p(y)$ will be between 1 (head aligned on the center of the track) and V2/2 (head lying over 2 tracks).

We shall now describe an example of the reading method invented, referring to FIGS. 4a to 4e.

In the method, the read signal samples from each individual head are filtered to eliminate the direct current component.

The filtered signal is then squared and then integrated over N samples.

It is possible to approximate these filtering and integration processes by using a $(1-z^{-1})$-type filter and then summing the absolute value of the result over a time T.

Figure 4A:
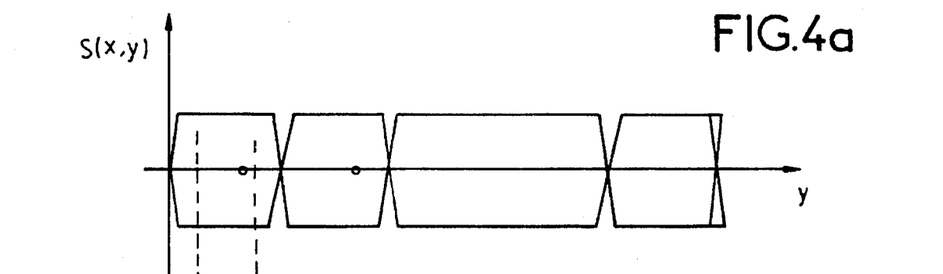
FIGS. 4a to 4e are diagrams which explain the invented method.

FIG. 4a shows a possible envelope for a transverse signal to be read.

Figure 4B:
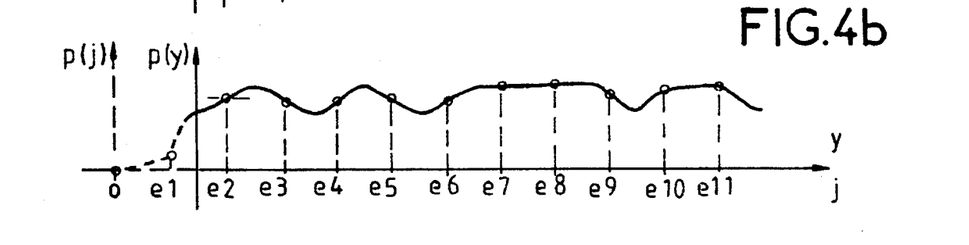
Figure 4C:
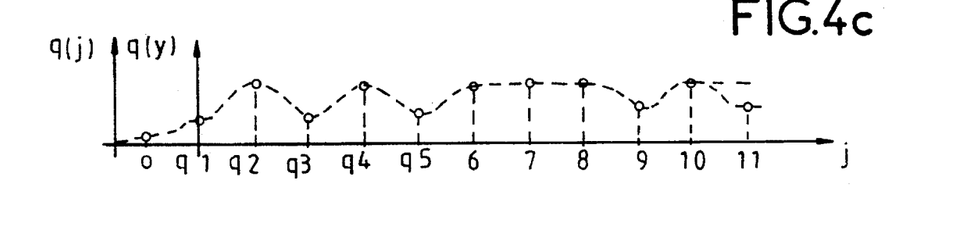

FIG. 4b represents the filtered and integrated signal $p(y)$ from a predefined number of individual heads (11 heads in FIG. 4b). These heads are at the positions shown by e1, e2, e3, etc. on FIG. 4b. Each head gives an integrated signal $p(j)$. Each integrated signal obtained in this way is located on the dotted line curve which represents the various values which would have been obtained if the complete signal read could have been continuously subjected to the above processing (filtration, squaring, integration).

In the example shown in FIGS. 4a and 4b, the head positions are such that the signal values $p(j)$ are not sufficiently different to indicate which values belong to which signal track $S(x,y)$. In fact, the heads are positioned symmetrically between the centers of the tracks and output identical mean levels. It is therefore clear that knowing $p(j)$ is not sufficient to accurately measure the offset between the heads and tracks. Another signal is therefore required to remove this ambiguity.

To this end, using the signals output at each instant by the various heads and considering each pair of adjacent heads, the sum of the signals output by each pair of heads is calculated and the absolute values of these sums are integrated over time T. This gives signal $q(j)$ shown in FIG. 4c. On FIG. 4c, signal q1 is obtained from the heads in positions e1 and e2, signal q2 from the heads in positions e2 and e3, signal q3 from the heads in positions e3 and e4, etc.

A signal $q(j)$, obtained by calculating the level (squared) of the signals from neighboring heads $(s1(i,j)+s1(i,j+1))$ can also be used.

The signal curve contains a maximum, for example, for q2 (FIG. 4c) indicating that heads e2 and e3 are reading signals from the same track, unlike, for example, e3 and e4 which give a minimum signal q3.

It is also possible to define q(j) as the product of s1(i,j) and s1(i,j+1). In this case, using the same hypotheses as for p(y), the value of q(j) could vary between 1 and 0, depending on the position of the heads. Simplified algorithms allowed q(j) to be estimated without requiring excessive computing capacity.

Figure 4D:
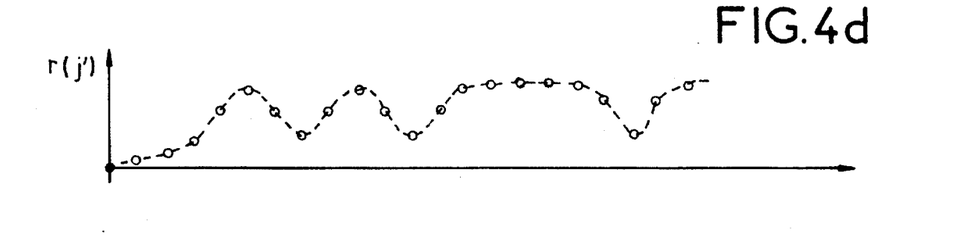

It is then possible to form a signal r(j') by linearly combining p(j) and q(j). The resultant signal is shown in FIG. 4d. This signal is a good reflection of p(y) with twice as many samples as in signal p(j).

Figure 4E:
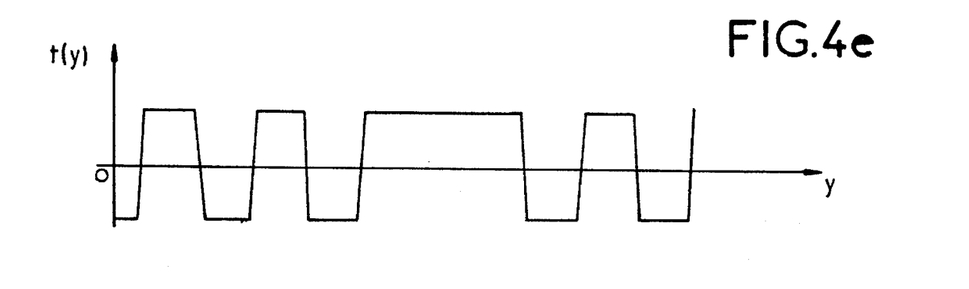

The track position error can then be calculated by intercorrelating signal r(j') with function t(j') which represents the feasible position of the tracks on the tape (FIG. 4e).

It can be expressed using Fourier tranforms P(v) and T(v), obtained by FFT, as $$G(v)=P(v).T(v)$$

and $g(y)=F(G(v))$

It would also be possible to use the phase correlation method which involves norming G(v) by P(v).T(v).

$$G(v)=P(v).T(v)/P(v).T(v)$$

and $g(y)=F(G(v))$

The position of the correlation peak gives the position of the tracks relative to the heads.

If the offset is small or if its approximate value is known (for example by prior calculation), it is sufficient to calculate a few points in the intercorrelation function. Direct calculation is then simpler, particularly if the head position is described by a t(j') function taking only the values +1 and −1 or again +1, 0, −1.

Figure 5A:
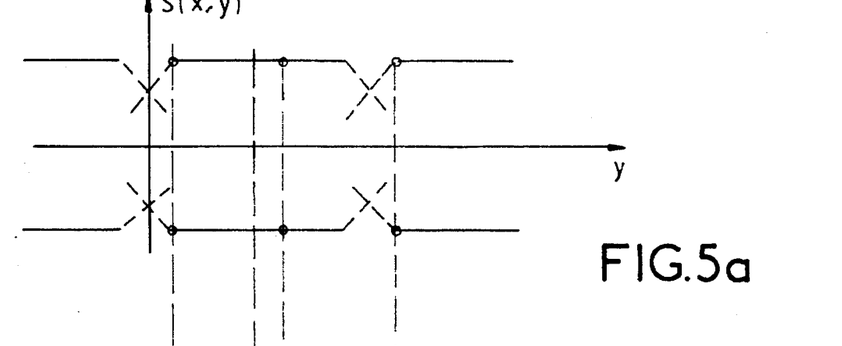
FIGS. 5a to 5c, 6a and 6b are other explanatory diagrams which show the offset of the heads relative to the magnetic tape tracks.
Figure 5B:
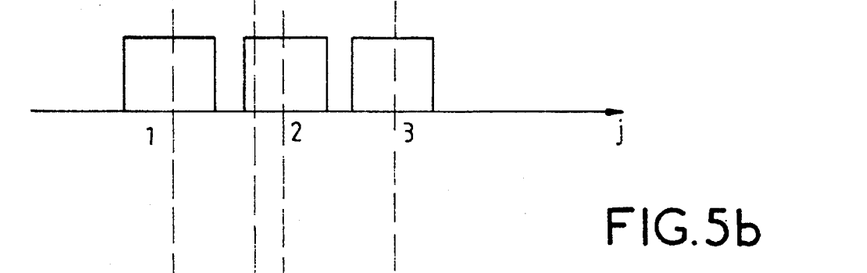
Figure 5C:
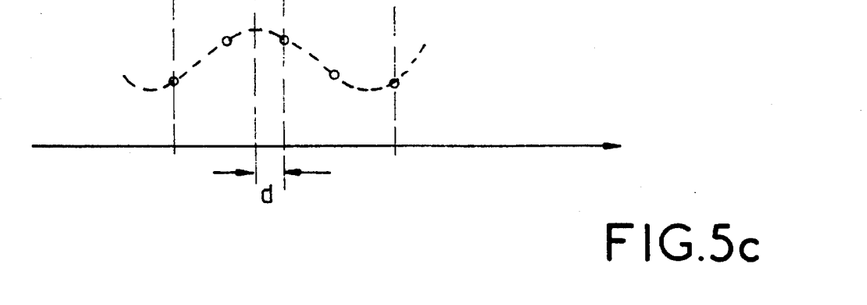

In the special case when the tracks are of the same width and at a constant pitch, signal t(y) becomes periodic. It is no longer necessary to know the absolute offset between tracks and heads; it is only necessary to assess the position of the heads relative to the nearest tracks. The calculation then need only be applied to a small number of neighboring heads (for example, 3 as shown in FIG. 5b). This gives 5 values of points on the r(j') curve and the position of the r(y) maximum can be calculated by interpolation (FIG. 5c).

Figure 6A:
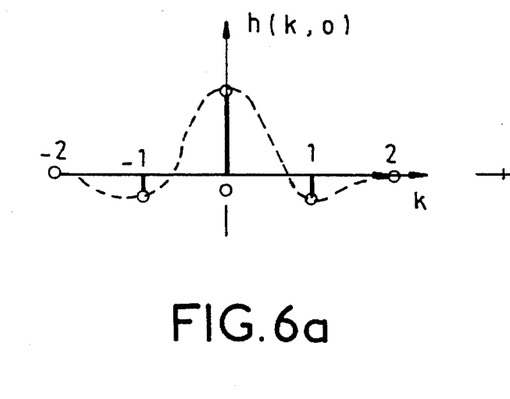
Figure 6B:
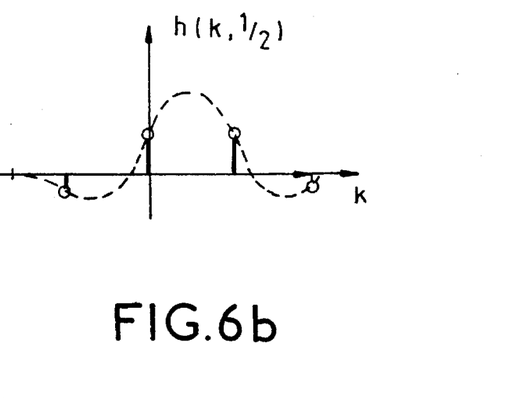

Knowing the read head offset d relative to the physical tracks, it is possible to shift the samples crosswise by passing them through a h(k,d) filter (FIGS. 6a and 6b) whose coefficients depend on the offset d.

In a more complicated situation, when the recording format is unknown and/or the tracks are not of the same width, the complete signal r(y) shown in FIG. 4d must be used to determine the track width and position. This allows the data recording format on the tape to be determined and makes it possible, firstly, to calculate the offset between the heads and tracks and, secondly, to decode the signals read from the tape.

Up to this point, we have described a method, complying with the invention, of locating the heads relative to tie tape tracks.

Figure 7:
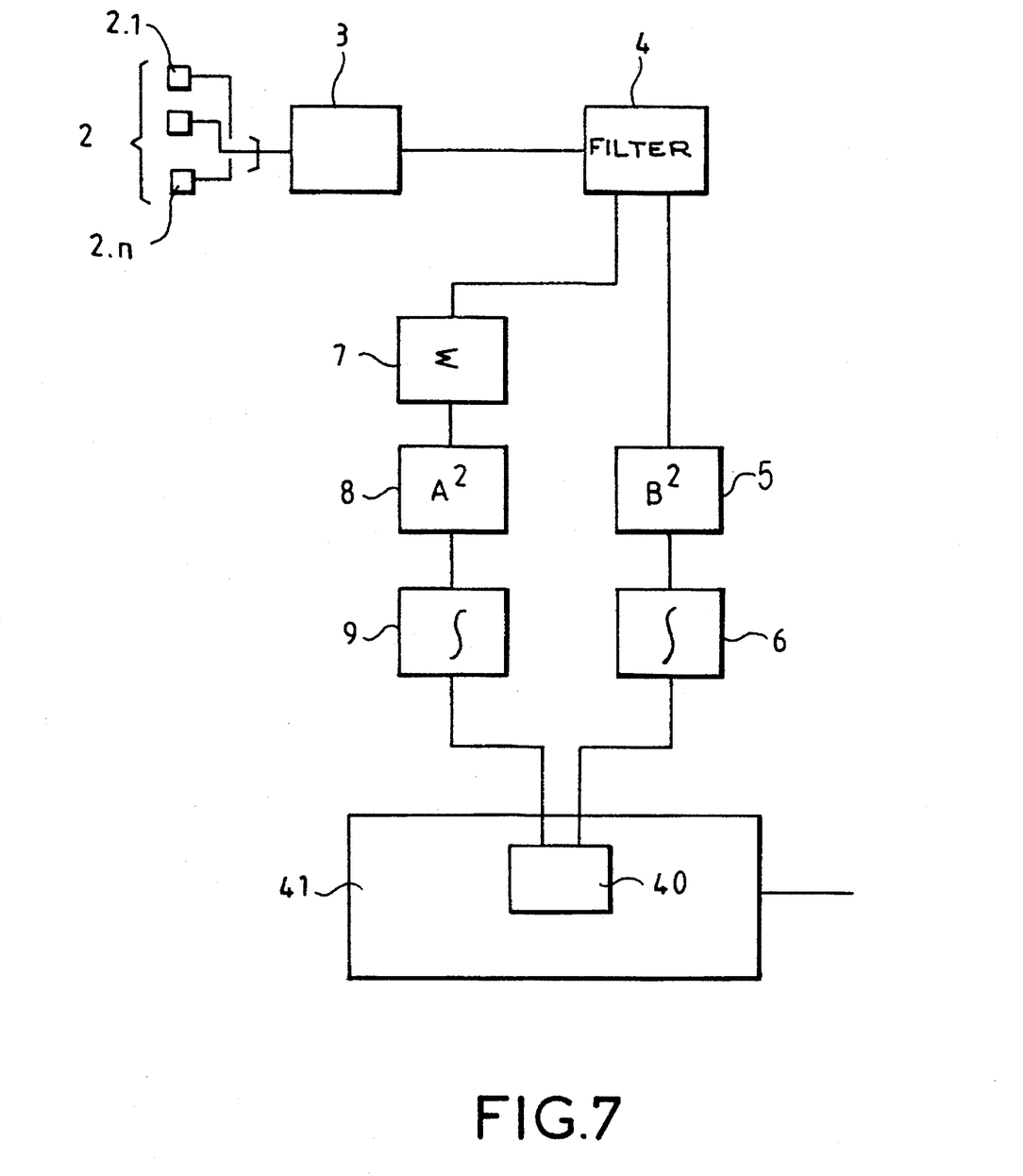
FIG. 7 is an example of an embodiment of a system complying with the invention.

FIG. 7 represents a system capable of applying this method.

The system consists of a read circuit 3 connected to the individual magnetic heads 21 to 2.n and reading the n heads in parallel. A filter circuit 4 receives the signal samples read from read circuit 3 and eliminates the direct current component. A squaring circuit 5 receives the various filtered signal samples and squares them. Alternatively; circuit 5 may simply accept the absolute value of the filtered signals. An integration circuit 6 integrates the signal samples from circuit 5 over a time T. Circuit 6 then outputs a signal p(y) as shown in FIG. 4b.

A set of adding circuits 7 contains one circuit for each pair of individual heads, each circuit summing the signal samples it receives. Circuit 8 then converts each sum into an absolute value or squares it and circuit 9 integrates the signal samples from circuit 8 over a time T.

Combination circuit 40 then records the signals output by integration circuits 6 and 9 in interleaved order. Finally, a processing circuit 41 uses the values recorded in combination circuit 40 to detect the maxima in the curves as shown in FIG. 4d and determines the geographic position of each maxima relative to the magnetic tape width and the distance d from the maximum to the closest magnetic head (see FIG. 5c).

Figure 8:
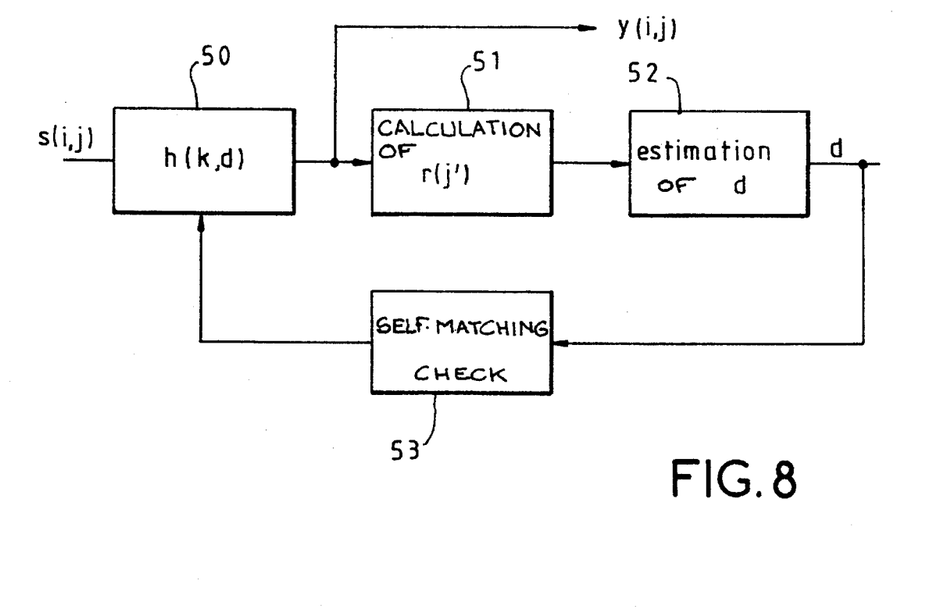
FIGS. 8 to 9 are variants on embodiments of the system complying with the invention.

FIG. 8 represents a variant embodiment in which circuit 50 is the magnetic head read circuit, circuit 51 calculates curve r(j') shown in FIG. 4d and circuit 52 calculates distance d (FIG. 5c). A self-matching check circuit 53 is added to these circuits.

This check circuit modifies the filter coefficients one by one complying with an auto-converging algorithm (for example a gradient) to minimize the calculated offset d.

Figure 9:
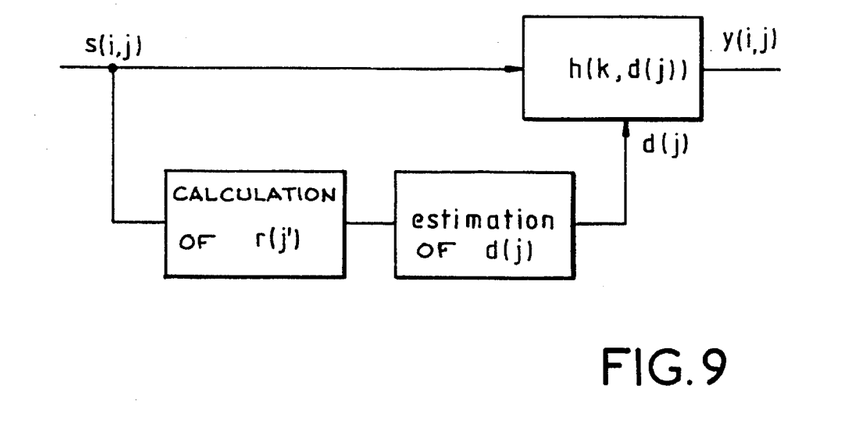

In addition, if the recording medium can distort, offset d can vary across the width of the tape. It is then necessary to calculate d(y) at a sufficient number of points by carrying out the above calculations on fractions Of the total width d and then interpolating to obtain d(j) for each head j. The coefficients of the h(k,d(j)) shift filter are then updated at each new sample processed (FIG. 9).

The function t(j') corresponding to the track geometry in the standard to be read is selected. The track offset is then corrected as above.

A logic controller calculates the signal from tracks whose width is greater than or equal to 2 samples by adding all the samples for a track. To this end, it uses a table which assigns samples to physical tracks. This table is derived directly from the t(j') function.

Once the physical track signals have thus been restored, the signal is processed as in the single-dimension case.

As mentioned previously, the system may not know the tape recording format. The r(j') function described above is then determined without any prior knowledge of the track geometry. This function is very similar to the t(j') function and can be used, after filtering, to determine the physical format of an unknown recording. The t(j') function is determined and it is then possible to apply the processing described above.

The method and system invented therefore allow multi-track recording media to be read using a row of heads. It makes it possible to:

restore the read signals with the best possible separation, even if the read heads are not aligned with the track;

correct for tape distortion which leads to different offset from one edge of the tape to another;

automatically recognize a recording format.

It is of particular value in recorders with a high track density, when following the track and compensating for tape distortion becomes a problem.

It can also be used in multi-standard tape readers, for example computer peripherals (tape decks) which can then read back-up copies when the recording standard is unknown or very old.

The above description is only an example. Other variants are possible within the terms of the invention. In particular, the description only refers to reading magnetic tapes but could equally be applied to reading any type of recorded data other than magnetic or data recorded, for example, on any other type of support (for example a disk or card). Equally, the number of read heads must exceed the number of tracks to be read. The number of heads could, for example, be approximately twice the number of tracks.

What is claimed is:

1. A method of reading data recorded in the form of a plurality of longitudinally parallel data tracks on a recording medium, comprising the steps of:

aligning a plurality of individual read heads in a row across said recording medium in a direction orthogonal to a longitudinal direction of said longitudinally parallel data tracks, said plurality of individual read heads being greater in number than said plurality of longitudinally parallel data tracks;

reading, via each one of said individual read heads, all data recorded on a data track which passes thereunder and outputting read signals during a read operation;

calculating an absolute value of each read signal output from each one of said individual read heads during said read operation and integrating, for each individual read head, absolute values of all signals output from each individual read head and outputting first output signals during a first integration operation;

integrating, for each pair of adjacent individual read heads, absolute values of sums of all read signals output from each pair of adjacent individual read heads and outputting second output signals during a second integration operation;

spatially interleaving said first output signals and said second output signals along a direction of said row of said plurality of individual read heads, thereby generating a value profile; and detecting local maxima of said value profile which indicate that a pair of individual read heads to which each of said local maxima correspond are reading data recorded on the same data track, and determining a position of each of said individual read heads relative to said plurality of longitudinally parallel data tracks.

2. A method of reading data recorded in the form of a plurality of longitudinally parallel data tracks on a recording medium, comprising the steps of:

aligning a plurality of individual read heads in a row across said recording medium in a direction orthogonal to a longitudinal direction of said longitudinally parallel data tracks, said plurality of individual read heads being greater in number than said plurality of longitudinally parallel data tracks;

reading, via each one of said individual read heads, all data recorded on a data track which passes thereunder and outputting read signals during a read operation;

calculating a squared value of each read signal output from each one of said individual read heads during said read operation and integrating, for each individual read head, squared values of all signals output from each individual read head and outputting first output signals during a first integration operation;

integrating, for each pair of adjacent individual read heads, absolute values of sums of all read signals output from each pair of adjacent individual read heads and outputting second output signals during a second integration operation;

spatially interleaving said first output signals and said second output signals along a direction of said row of said plurality of individual read heads, thereby generating a value profile; and detecting local maxima of said value profile which indicate that a pair of individual read heads to which each of said local maxima correspond are reading data recorded on the same data track, and determining a position of each of said individual read heads relative to said plurality of longitudinally parallel data tracks.

3. A method of reading data recorded in the form of a plurality of longitudinally parallel data tracks on a recording medium, comprising the steps of:

aligning a plurality of individual read heads in a row across said recording medium in a direction orthogonal to a longitudinal direction of said longitudinally parallel data tracks, said plurality of individual read heads being greater in number than said plurality of longitudinally parallel data tracks;

reading, via each one of said individual read heads, all data recorded on a data track which passes thereunder and outputting read signals during a read operation;

calculating an absolute value of each read signal output from each one of said individual read heads during said read operation and integrating, for each individual read head, absolute values of all signals output from each individual read head and outputting first output signals during a first integration operation;

integrating, for each pair of adjacent individual read heads, squared values of sums of all read signals output from each pair of adjacent individual read heads and outputting second output signals during a second integration operation;

spatially interleaving said first output signals and said second output signals along a direction of said row of said plurality of individual read heads, thereby generating a value profile; and detecting local maxima of said value profile which indicate that a pair of individual read heads to which each of said local maxima correspond are reading data recorded on the same data track, and determining a position of each of said individual read heads relative to said plurality of longitudinally parallel data tracks.

4. A method of reading data recorded in the form of a plurality of longitudinally parallel data tracks on a recording medium, comprising the steps of:

aligning a plurality of individual read heads in a row across said recording medium in a direction orthogonal to a longitudinal direction of said longitudinally parallel data tracks, said plurality of individual read heads being greater in number than said plurality of longitudinally parallel data tracks;

reading, via each one of said individual read heads, all data recorded on a data track which passes thereunder and outputting read signals during a read operation;

calculating an absolute value of each read signal output from each one of said individual read heads during said read operation and integrating, for each individual read head, absolute values of all signals output from each individual read head and outputting first output signals during a first integration operation;

integrating, for each pair of adjacent individual read heads, product values of all read signals output from each pair of adjacent individual read heads and outputting second output signals during a second integration operation;

spatially interleaving said first output signals and said second output signals along a direction of said row of said plurality of individual read heads, thereby generating a value profile; and detecting local maxima of said value profile which indicate that a pair of individual read heads to which each of said local maxima correspond are reading data recorded on the same data track, and determining a position of each of said individual read heads relative to said plurality of longitudinally parallel data tracks.

5. The method according to claim 1, wherein said recording medium is a magnetic recording medium and said individual read heads are magnetic read heads.

6. The method according to claim 5, wherein said recording medium is a magnetic tape.

7. A system for reading data recorded in the form of a plurality of longitudinally parallel data tracks on a recording medium, said system comprising:

a plurality of individual read heads aligned in a row across said recording medium in a direction orthogonal to a longitudinal direction of said longitudinally parallel data tracks;

a plurality of first integration circuits, corresponding in number to a number of said individual read heads, each one of said first integration circuits integrating absolute values of signals output by a corresponding individual read head;

a plurality of second integration circuits, each one of said second integration circuits integrating a sum of absolute values of signals output by a corresponding pair of adjacent individual read heads; and a circuit for linearly combining said first integration signal and said second integration signal to determine a position and a width of each of said plurality of longitudinally parallel tracks on said recording medium.

8. The system according to claim 7, wherein said plurality of individual read heads is at least twice as great in number as a number of said longitudinally parallel data tracks.

9. The system according to claim 7, further comprising a filter circuit for interpolating data read by said individual read heads so as to determine a position of each of said longitudinally parallel data tracks on said recording medium and to extract data recorded on said longitudinally parallel data tracks.

10. A system for reading data recorded in the form of a plurality of longitudinally parallel data tracks on a recording medium, said system comprising:

a plurality of individual read heads aligned in a row across said recording medium in a direction orthogonal to a longitudinal direction of said longitudinally parallel data tracks;

a plurality of first integration circuits, corresponding in number to a number of said individual read heads, each one of said first integration circuit integrating squared values of signals output by a corresponding individual read head;

a plurality of second integration circuits, each one of said second integration circuits integrating a sum of squared values of signals output by a corresponding pair of adjacent individual read heads; and a circuit for linearly combining said first integration signal and said second integration signal to determine a position and a width of each of said plurality of longitudinally parallel data tracks on said recording medium.

11. A system for reading data recorded in the form of a plurality of longitudinally parallel data tracks on a recording medium, said system comprising:

a plurality of individual read heads aligned in a row across said recording medium in a direction orthogonal to a longitudinal direction of said longitudinally parallel data tracks;

a plurality of first integration circuits, corresponding in number to a number of said individual read heads, each one of said first integration circuit integrating absolute values of signals output by a corresponding individual read head;

a plurality of second integration circuits, corresponding in number to one-half of a number of said individual read heads, each one of said second integration circuits integrating product values of signals output by a corresponding pair of adjacent individual read heads; and a circuit for linearly combining said first integration signal and said second integration signal to determine a position and a width of each of said plurality of longitudinally parallel data tracks on said recording medium.

12. The system according to claim 7, further comprising a filter circuit, a self-matching check circuit, and a combination circuit, wherein said self-matching check circuit receives data representing a position of each of said data tracks on said recording medium from said combination circuit and generates a feedback signal to modify characteristics of said filter circuit.

13. The system according to claim 7, wherein said recording medium is a magnetic medium and said individual read heads are magnetic heads.

14. The system according to claim 7, wherein said plurality of individual read heads is greater in number than said plurality of longitudinally parallel data tracks.

* * * * *